United States Patent
Dai (10) Patent No.: US 7,149,170 B2
(45) Date of Patent: Dec. 12, 2006

(54) METHOD FOR DECODING ADDRESS IN PRE-GROOVE DATA OF AN OPTICAL DISC DRIVE

(75) Inventor: Chih-Long Dai, Taipei (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 457 days.

(21) Appl. No.: 10/708,540

(22) Filed: Mar. 10, 2004

(65) Prior Publication Data

US 2005/0122864 A1    Jun. 9, 2005

(30) Foreign Application Priority Data

Dec. 4, 2003    (TW) ............... 92134161 A (51) Int. Cl.
G11B 5/09    (2006.01)
G11B 7/00    (2006.01)
(52) U.S. Cl. ............... 369/59.19; 369/59.2; 369/44.13; 369/47.48
(58) Field of Classification Search ............... None
See application file for complete search history.

(56) References Cited

U.S. PATENT DOCUMENTS

2002/0048239 A1*   4/2002   Ueki et al. ............... 369/47.17

2003/0043718 A1*   3/2003   Minamino et al. ....... 369/59.25

FOREIGN PATENT DOCUMENTS

WO    WO 03/034413 A1    4/2003

* cited by examiner

Primary Examiner—Muhammad Edun
(74) Attorney, Agent, or Firm—Winston Hsu (57) ABSTRACT

A method for optical drive decoding of address in pre-groove (ADIP) data is provided to decode an input wobble signal to an ADIP unit signal. The method includes generating a wobble carrier frequency signal having the same phase with the wobble signal, multiplying the wobble carrier frequency signal by the input wobble signal to generate a product signal, accumulating the value of the product signal in each clock to generate a quotient summation signal, determining the phase change of the input wobble signal according to the value of the quotient summation to generate a phase change signal, and generating the ADIP unit signal by comparing the phase change signal with a plurality of ADIP patterns.

5 Claims, 10 Drawing Sheets

| Disk type | Status | Method 1 | Method 2 | Method 3 |
|---|---|---|---|---|
| DVD+R | Writen | 440 | 81 | 25 |
| DVD+R | Blank | 85 | 12 | 4 |
| DVD+RW | Writen | 9472 | 88 | 8 |
| DVD+RW | Blank | 132 | 12 | 3 |

Fig. 10

METHOD FOR DECODING ADDRESS IN PRE-GROOVE DATA OF AN OPTICAL DISC DRIVE

BACKGROUND OF INVENTION

1. Field of the Invention

The present invention relates to a method for decoding an address in pre-groove (ADIP) data of an optical disc drive, and more specifically, to a method for decoding ADIP data by comparing ADIP data with signals generated by quotient summation.

2. Description of the Prior Art

Figure 1:
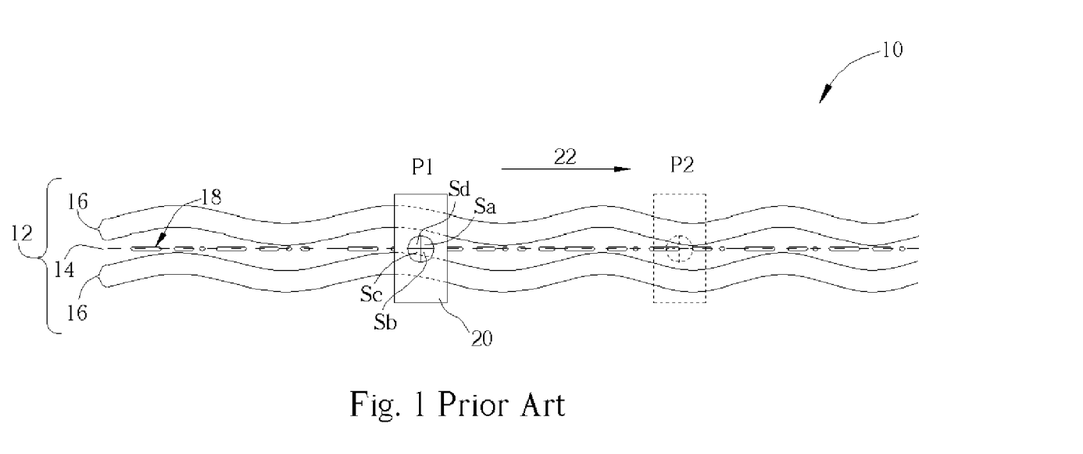
FIG. 1 illustrates a conventional optical drive reading a track of an optical disc.

Please refer to FIG. 1 showing a conventional optical drive reading a track 12 of an optical disc 10. In the DVD+R/RW disc 10, the track 12 can be divided into two types: a data track 14 for recording data and a wobble track 16 for recording ADIP data corresponding to sections on the disc. The data track 14 spirals around the center of the disc 10 following the track 12, and the wobble tracks 16 also spiral around the center of the disc 10, however, they wobble up and down in a small amplitude. In addition, the wobble tracks 16 are continuous protruding tracks, and the data track 14 is located in the groove formed between two wobble tracks 16. The data track 14 has continuous record signals 18 (corresponding to pits) of different lengths and different characteristics of reflection. These record signals 18 represent different data information, thus the disc 10 can record data by controlling the length of the record signal 18.

A pickup head 20 of an optical disc drive includes four sensors Sa, Sb, Sc, Sd for reading data in the wobble tracks 16. Since the characteristics of reflection of the groove and the protruding tracks differ from each other, the reflection sensed by the sensors Sa, Sb, Sc, Sd differs accordingly, thus wobble signals can be obtained by calculating sensed values of the sensors Sa, Sb, Sc, Sd. As the disc 10 rotates, the pickup head 20 follows the disc 10 along the direction shown by arrow 22 to read the sensed values along the track 12. For instance, when the pickup head 20 is located at P1, the position of the sensors Sa, Sd corresponds to the groove of the data track 14, and the position of the sensors Sb, Sc corresponds to the protrusion of the wobble track 16. When the pickup head 20 is located at P2, the sensors Sa, Sd, originally located over the groove, move to the position over the protrusion of the wobble track 16. Additionally, the sensors Sb, Sc, originally located over the protrusion of the wobble track 16, move to the position over the groove of the data track 14. Accordingly, the sensed value as well as the wobble signal change. In such a manner, the pickup head 20 generates the wobble signals according to the wobble track, and the wobble signals can be decoded into address in pre-groove (ADIP) data.

Figure 2:
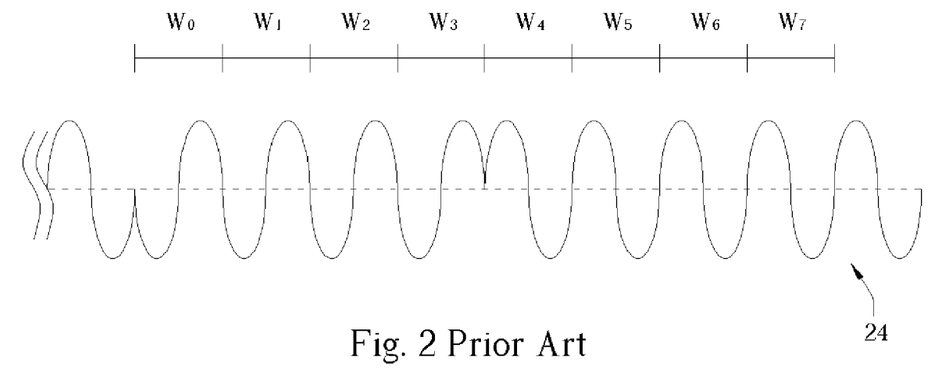
FIG. 2 illustrates a conventional wobble signal corresponding to ADIP unit representing SYNC.
Figure 3:
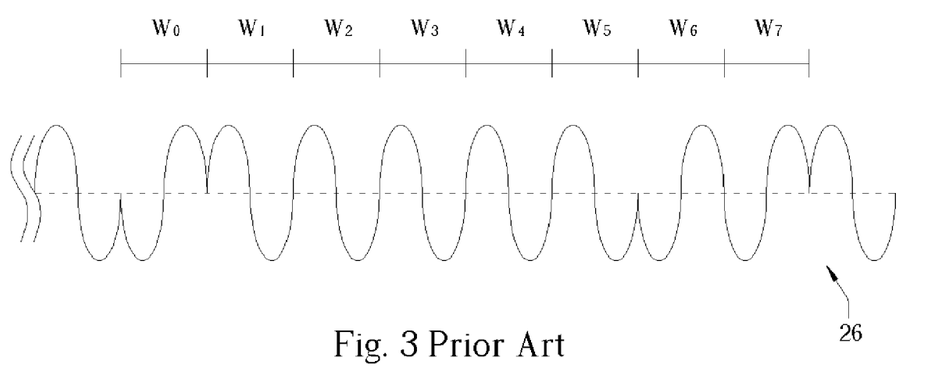
FIG. 3 illustrates a conventional wobble signal corresponding to ADIP unit representing "0".
Figure 4:
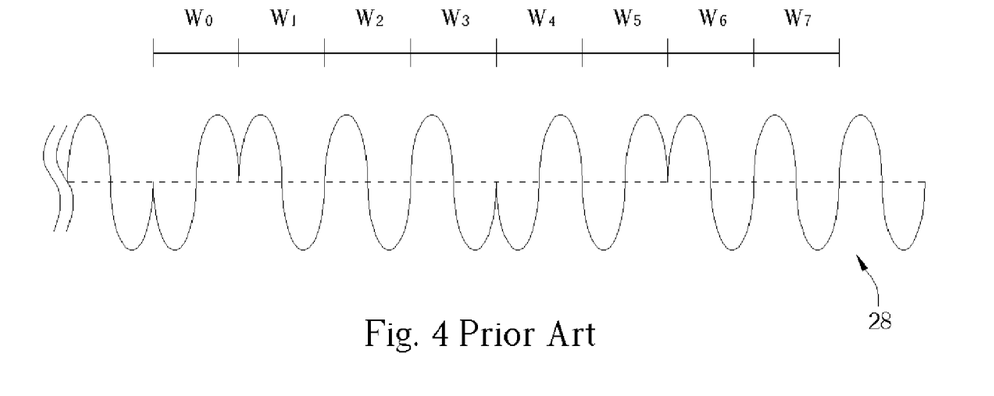
FIG. 4 illustrates a conventional wobble signal corresponding to ADIP unit representing "1".

Please refer to FIG. 2 to FIG. 4 respectively showing conventional wobble signals 24, 26, 28. Every two record sections on the disc 10 correspond to 93 wobble periods, wherein 8 wobble periods record the ADIP data using phase modulation (PM). As shown in FIG. 2, the wobble signal 24 includes 8 wobble periods W0, W1, W2, W3, W4, W5, W6, W7 recording the ADIP data using phase modulation. In the wobble periods W0, W4, the phase of the wobble signal 24 changes by 180 degrees, and in this case, the wobble signal 24 corresponds to an ADIP sync unit. As shown in FIG. 3, the wobble signal 26 includes 8 wobble periods W0, W1, W2, W3, W4, W5, W6, W7 recording the ADIP data using phase modulation. In the wobble periods W0, W1, W6, the phase of the wobble signal 26 changes by 180 degrees, and in this case, the wobble signal 26 corresponds to an ADIP data unit being "0". As shown in FIG. 4, the wobble signal 28 includes 8 wobble periods W0, W1, W2, W3, W4, W5, W6, W7 recording the ADIP data using phase modulation. In the wobble periods W0, W1, W4, W6, the phase of the wobble signal 28 changes by 180 degrees, and in this case, the wobble signal 28 corresponds to an ADIP data unit being "1".

As described above, the decoding of ADIP data plays an important role when burning the DVD+R/RW disc. The ADIP data includes all the information on the DVD+R/RW disc, and the frequency of the wobble signal represents the linear speed of disc rotation. For constant linear velocity (CLV) reading, the wobble signals are utilized as feedback signals to a spindle motor. And for constant angular velocity (CAV), the wobble signals are used to generate writing clocks. However, the wobble signals may be interfered with due to defects on the disc, noise, or laser power fluctuations, so that the ADIP data may be lost or the frequency of the wobble signals may be unstable.

SUMMARY OF INVENTION

It is therefore a primary objective of the present invention to provide a method for decoding ADIP data of an optical disc drive, in order to solve the problems in the prior art.

Briefly summarized, the present invention provides a method for decoding address data being ADIP data of an optical disc drive, for decoding an input wobble signal into an ADIP unit signal. The optical disc drive includes a phase lock loop, a cosine signal generator, a multiplier, an accumulator, a phase data processor and an ADIP unit detector. The method includes (a) converting a wobble carrier frequency signal output by the phase lock loop into a wobble carrier frequency signal with the same phase as the input wobble signal, by the cosine signal generator, (b) multiplying the wobble frequency signal output by the cosine signal generator with the input wobble signal to obtain a product signal, by the multiplier, (c) accumulating the product signals at each clock to obtain a quotient summation signal, by the accumulator, (d) determining phase changes of the input wobble signal according to whether the quotient summation signal is positive or negative to obtain a phase change signal, by the phase data processor, and (e) comparing the phase change signal with the plurality of ADIP patterns by the ADIP unit detector, and determining an ADIP unit signal according to the ADIP pattern closest to the phase change signal.

The present invention further provides a device to implement the method mentioned above.

These and other objectives of the present invention will no doubt become obvious to those of ordinary skill in the art after reading the following detailed description of the preferred embodiment that is illustrated in the various figures and drawings.

DETAILED DESCRIPTION

Figure 5:
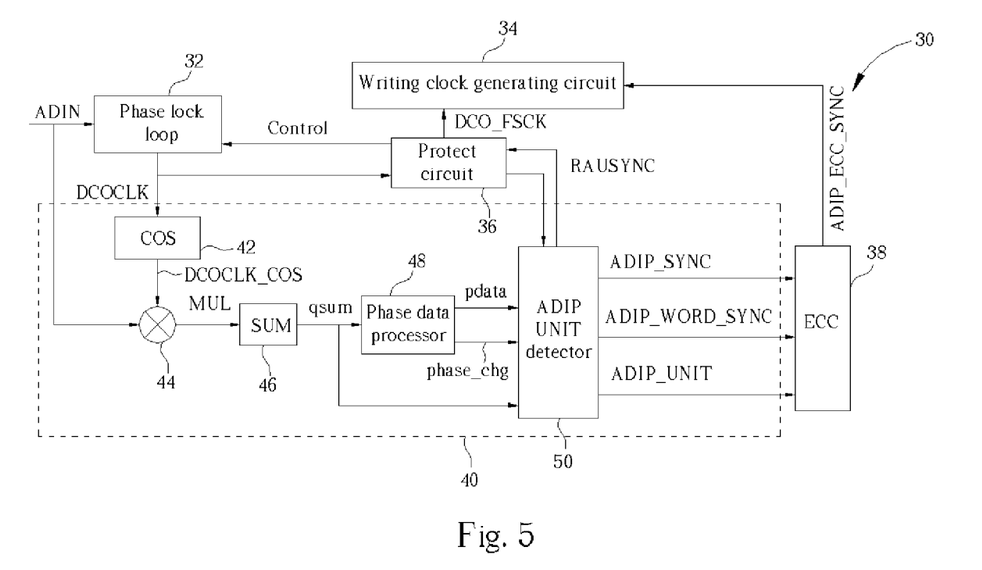
FIG. 5 is a block diagram of an ADIP decoder according to the present invention.

Please refer to FIG. 5 showing a block diagram of an ADIP decoder 30 according to the present invention. The ADIP decoder 30 includes a phase lock loop 32, a decoding circuit 40, a writing clock generating circuit 34, and a protection circuit 36. The phase lock circuit 32 generates a wobble carrier frequency signal according to an input wobble signal, to decode data, control a spindle motor and generate the writing clock according to the wobble carrier frequency signal. The decoding circuit 40 generates an ADIP unit signal (0, 1, or SYNC), and then generates a wobble address through an error correction code (ECC) block 38. The writing clock generating circuit 34 generates clocks required when writing the disc according to the wobble carrier frequency signal. The protection circuit 36 generates reference signals to prevent noise interference. The decoder 30 according to the present invention provides two types of decoding to the decoding circuit 40, in order to increase data recognition. The decoding circuit 40 includes a cosine signal generator 42, a multiplier 44, an accumulator 46, a phase data processor 48, and an ADIP unit detector 50. The operation of these devices is described as follows.

Figure 6:
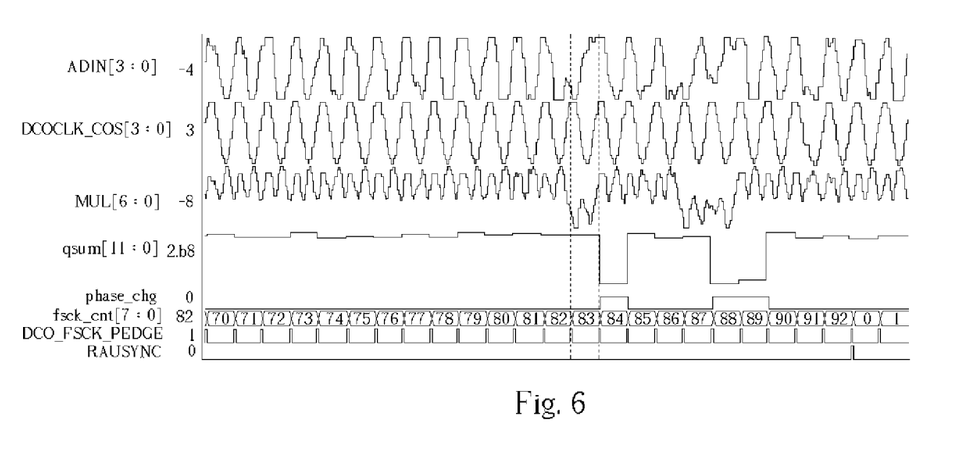
FIG. 6 illustrates the signals shown in FIG. 5.

Please refer to FIG. 6 showing the signals shown in FIG. 5. Since the wobble carrier frequency signal (DCOCLK) has a phase difference of 90 degrees from the input wobble signal (ADIN), the cosine signal generator 42 converts the wobble carrier frequency signal (DCOCLK) into a frequency signal (DCOCLK_COS) having the same phase as the input wobble signal (ADIN). The multiplier 44 then multiplies the frequency signal (DCOCLK_COS) with the input wobble signal (ADIN). In phase encoding, since the frequency signal (DCOCLK_COS) and the input wobble signal (ADIN) have a phase difference of 180 degrees with respect to each other, the product signal (MUL) is negative. Subsequently, the accumulator 46 accumulates the product signals of each clock (DCO_FSCK_PEDGE) to obtain a quotient summation signal (qsum). The phase data processor 48 determines whether the phase of the input wobble signal (ADIN) changes or not to obtain a phase change signal (phase_chg). Finally, the ADIP unit detector 50 generates the ADIP unit signal (ADIP_UNIT) being "0", "1" or SYNC. The advantage of quotient summation is that the input wobble signals are more resistant to noises after quotient summation. In addition, according to phase modulation, only when the wobble signals generated by the phase lock loop 32 are controlled in a specific error range can a less precise analog-to-digital converter (ADC) be used for generating the input wobble signal. However, it is known by experience that the wobble signals change in form due to defects of the disc or material characteristic changes of the disc after writing data. Because of this, it is difficult to determine the ADIP unit signals even by quotient summation. Therefore, the present invention provides a fuzzy compare method and a relative shape compare method to further improve the recognition of the ADIP unit signals.

Figure 7:
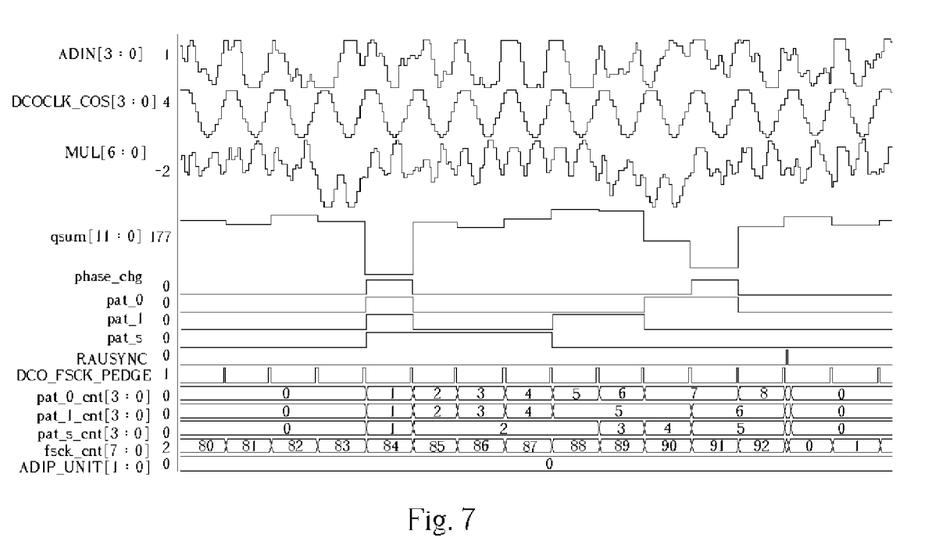
FIG. 7 illustrates a fuzzy compare method according to the present invention.

Please refer to FIG. 7 showing the fuzzy compare method according to the present invention. Theoretically, the ADIP unit signal (ADIP_UNIT) must be "0", "1" or SYNC. Thus, at the position where the ADIP unit signals of the input wobble signal (ADIN) appear, that is, from the 84$^{th}$ clock (fsck_cnt) to the 91$^{th}$ clock, compare the phase change signal (phase_chg) of the input wobble signal (ADIN) with the patterns representing the ADIP units "0", "1" and SYNC (pat_0, pat_1, pat_s) in each clock. If the patterns are the same as the phase change signal, gradually increase the pattern count signals (pat_0_cnt, pat_1_cnt, pat_s_cnt). If they are different, do not change the pattern count signals. After completing the comparison in each clock, choose three pattern count signals having the maximum values to be the output values of the ADIP unit signal. Since the ADIP unit signals (being "0", "1" and SYNC) are encoded by inputting 8 phase changes, the fuzzy compare method allows any one of the 8 phase changes to be misjudged and the ADIP unit signal closest to the input wobble signal can still be found. In FIG. 7, the phase change signal (phase_chg), determined by the quotient summation signal (qsum), and the pattern representing ADIP unit "0" (pat_0) are different only during the 90$^{th}$ clock. Thus the pattern count signal (pat_0_cnt) gets a maximum value so that the ADIP unit signal (ADIP_UNIT) is determined as "0".

Figure 8:
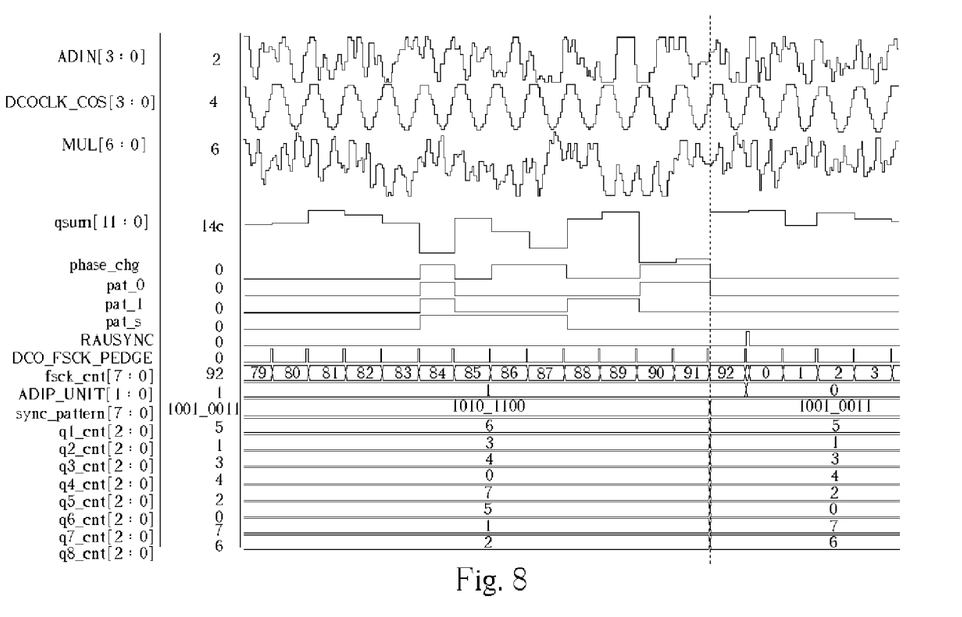
FIG. 8 illustrates a relative shape compare method according to the present invention.

Please refer to FIG. 8 showing the relative shape compare method according to the present invention. When there is distortion or center deviation in the input wobble signal, the result of the quotient summation signal (qsum) may have one or more phase changes to the incorrect value, so that the ADIP unit signal (ADIP_UNIT) cannot be determined correctly even using the fuzzy compare method. In this case, find the 4 clocks having the smallest quotient summation from the 84$^{th}$ clock (fsck_cnt) to the 91$^{th}$ clock, and encode them as "1" and encode the rest as "0" in order to obtain sync pattern (sync_pattern). And then compare the patterns representing the ADIP units "0", "1" and SYNC (pat_0, pat_1, pat_s) with the sync pattern in order to find the ADIP unit signal closest to the input wobble signal. In FIG. 8, 8 quotient summation count signals (q1_cnt to q8_cnt) can be obtained at the 92$^{th}$ clock. The priorities of the 1$^{st}$ quotient summation count signal (q1_cnt) to the 8$^{th}$ quotient summation count signal (q8_cnt) are 5, 1, 3, 4, 2, 0, 7, 6, respectively. Wherein, the smaller the value is, the larger the quotient summation is. Thus, encode the 84$^{th}$, the 87$^{th}$, the 90$^{th}$, and the 91$^{st}$ clocks as "1", and the 85$^{th}$, the 86$^{th}$, the 88$^{th}$, and the 89$^{th}$ clocks as "0". In this way, the sync pattern (sync_pattern) obtained is 1001_0011. By comparing the sync pattern with the patterns representing the ADIP unit "0", "1" and SYNC encoded as 1000_0011, 1000_1100, 1111_0000, respectively, it can be determined that there is only one phase change between each other so that the ADIP unit signal (ADIP_UNIT) can be determined as "0".

Figure 9:
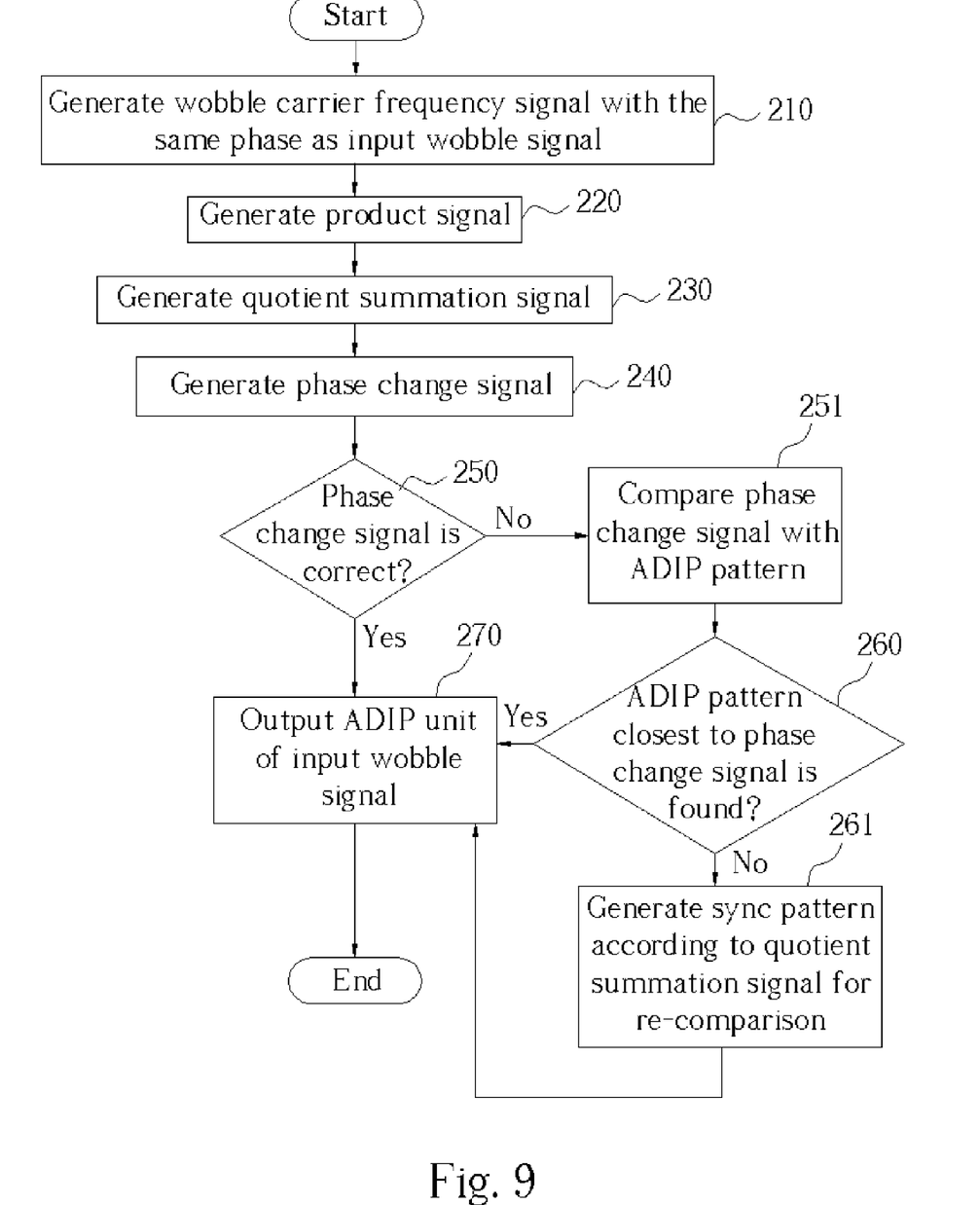
FIG. 9 is a flowchart according to the present invention.

Please refer to FIG. 9 showing a flowchart according to the present invention. In conjunction with the descriptions in FIG. 7 and FIG. 8, the method according to the present invention is as follows:

Step 210: Convert the wobble carrier frequency signal output by the phase lock loop 32 into the wobble carrier frequency signal with the same phase as the input wobble signal by means of the cosine signal generator 42.

Step 220: Multiply the wobble carrier frequency signal output by the cosine signal generator 42 with the input wobble signal in order to obtain the product signal.

Step 230: Accumulate the product signals at every clock using the accumulator 46 in order to obtain the quotient summation signal.

Step 240: Determine the phase change of the input wobble signal according to whether the quotient summation signal is positive or negative using the phase data processor 48 in order to obtain the phase change signal.

Step 250: Determine whether the phase change signal represents an ADIP unit. If yes, proceed to Step 270, and if no, proceed to Step 251.

Step 251: Execute the fuzzy compare method. Compare the phase change signal with the plurality of ADIP patterns using the ADIP unit detector 50, and determine the ADIP unit of the input wobble signal according to the ADIP pattern closest to the phase change signal.

Step 260: Is the ADIP pattern closest to the phase change signal found (differing by only one clock)? If yes, proceed to Step 270, and if no, proceed to Step 261.

Step 261: Execute the relative shape compare method. Sequence the quotient summation signals at each clock using the ADIP unit detector 50, select the plurality of clocks having smaller quotient summation signals to encode in order to obtain the sync pattern, and then compare the sync pattern with the plurality of ADIP patterns in order to determine the ADIP unit of the input wobble signal.

Step 270: Output the ADIP unit of the input wobble signal.

Figure 10:
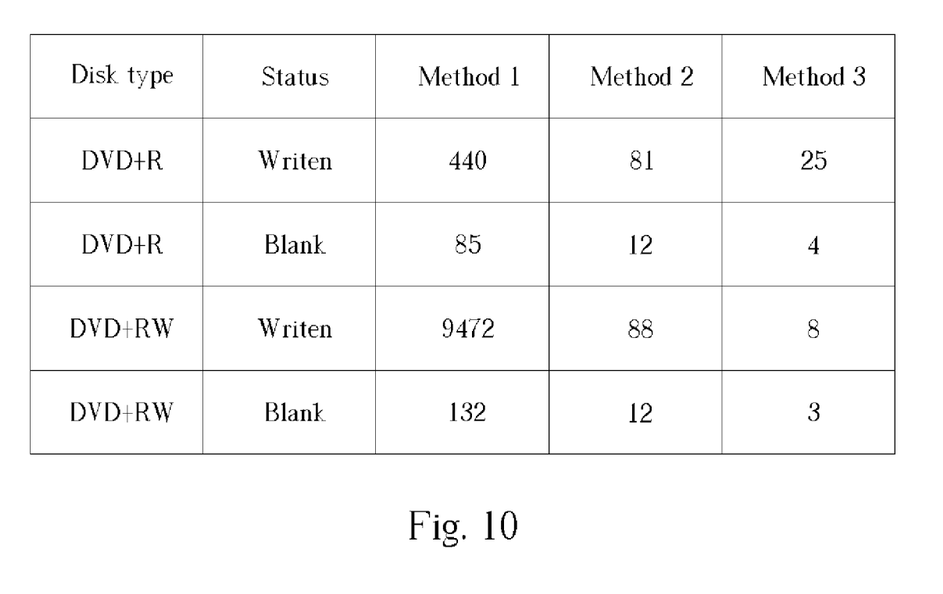
FIG. 10 illustrates a result table for experiments performed according to the present invention.

Please refer to FIG. 10 showing a result table for experiments performed according to the present invention. The table in FIG. 10 shows ADIP unit lost error numbers obtained by three methods of different disc types having different statuses. Wherein, method 1 is the quotient summation method, method 2 is the fuzzy compare method, and method 3 is the fuzzy compare method with the relative shape compare method. The larger the number is, the higher the error rate is. As shown by the table, the error rate is obviously improved and less influenced by noise on the wobble signal after using method 2 and method 3. Please notice that the relative shape compare method can also be utilized separately, which has similar function with fuzzy compare method. However, the relative shape compare method can only be used after 8 clocks have passed, while the fuzzy compare method can be used during these 8 clocks. As such, the optimal combination is to compare the first 8 clocks using the fuzzy compare method, and then compare the rest using the relative shape compare method. In this way, the smallest error rate can be realized as shown by method 3 in FIG. 10. Moreover, if the value of the ADIP unit signal (ADIP_UNIT) cannot be determined by either the fuzzy compare method or the relative shape method, the ADIP unit signal will be marked as "unknown" and sent to the ECC block for ECC process.

As mentioned above, by means of the quotient summation signal obtained from the input wobble signal using quotient summation, it is easier to determine the position where the phase changes. The ADIP unit of the input wobble signal can thereby be determined according to the phase change signal obtained from the quotient summation signal. When the detection of the phase change is incorrect, the present invention provides the fuzzy compare method and the relative shape compare method for modification. The difference between the two methods is that the fuzzy compare method executes comparison using the phase change signal determined from the quotient summation signal, while the relative shape compare method finds clocks with smaller values from the quotient summation signals to re-encode and then execute comparison.

In contrast to the prior art, the fuzzy compare method and the relative shape compare method according to the present invention can improve the ability of determining the ADIP unit of the wobble signals. Furthermore, since the ADIP decoding plays an important role in reading and writing DVD+R/RW discs, the present invention can increase the ability of the optical disc drive of reading optical discs.

Those skilled in the art will readily observe that numerous modifications and alterations of the device and the method may be made while retaining the teachings of the invention. Accordingly, the above disclosure should be construed as limited only by the metes and bounds of the appended claims.

What is claimed is:

1. A method for decoding address data of an optical disc drive for decoding an input wobble signal into an address data unit signal, the optical disc drive comprising a phase lock loop, a cosine signal generator, a multiplier, an accumulator, a phase data processor and an address data unit detector, the method comprising:
   (a) converting a wobble carrier frequency signal output by the phase lock loop into a wobble carrier frequency signal with the same phase as the input wobble signal using the cosine signal generator;
   (b) multiplying the wobble frequency signal, output by the cosine signal generator, with the input wobble signal to obtain a product signal using the multiplier;
   (c) accumulating the product signals at each clock to obtain a quotient summation signal using the accumulator;
   (d) determining phase changes of the input wobble signal according to whether the quotient summation signal is positive or negative to obtain a phase change signal using the phase data processor; and
   (e) comparing the phase change signal with the plurality of address data patterns using the address data unit detector, and determining an address data unit signal according to the address data pattern closest to the phase change signal.

2. The method of claim 1, wherein Step (e) comprises comparing the phase change signal with the values of the plurality of address data patterns of each clock; when there is an address data pattern having the same value as the phase change signal, adding a count number to the address data pattern; and eventually using the address data pattern having the most count numbers as the address data unit signal.

3. The method of claim 1, further comprising:
   (f) sequencing the values of the quotient summation signals at each clock using the address data unit detector, and selecting a plurality of clocks having smaller quotient summations in order to obtain a sync pattern; and
   (g) comparing the sync pattern with the plurality of address data patterns using the address data unit detector, and using the ADIP pattern closest to the sync pattern as the address data unit signal.

4. The method of claim 1, wherein the optical disc drive is a DVD+R/RW drive and the address data is address in pre-groove (ADIP).

5. A device for implementing the method of claim 1.

* * * * *